United States Patent [19]
Forsten

[11] Patent Number: 6,103,643
[45] Date of Patent: Aug. 15, 2000

[54] HIGH PERFORMANCE FABRICS FOR CARTRIDGE FILTERS

[75] Inventor: Herman Hans Forsten, Hockessin, Del.

[73] Assignee: E. I. du Pont de Nemours and Company, Wilmington, Del.

[21] Appl. No.: 09/116,102

[22] Filed: Jul. 15, 1998

[51] Int. Cl.[7] .............................. B32B 27/04; B32B 27/12
[52] U.S. Cl. ........................ 442/103; 442/402; 428/181
[58] Field of Search ................................ 442/103, 402; 428/181

[56] References Cited

U.S. PATENT DOCUMENTS

| | | | |
|---|---|---|---|
| 4,405,341 | 9/1983 | Jaschek et al. | 51/298 |
| 4,536,439 | 1/1985 | Forsten | 428/280 |
| 4,874,658 | 10/1989 | Sasaki et al. | 428/220 |
| 4,961,974 | 10/1990 | Jones | 428/34.2 |
| 5,175,339 | 12/1992 | Forsten | 55/379 |
| 5,350,620 | 9/1994 | Sundet et al. | 428/172 |
| 5,397,632 | 3/1995 | Murphy, Jr. et al. | 442/358 |

FOREIGN PATENT DOCUMENTS

| | | | |
|---|---|---|---|
| 1 417 696 | 12/1975 | United Kingdom | D04H 1/42 |
| 92/19804 | 11/1992 | WIPO | D06M 10/00 |
| WO 96/24431 | 8/1996 | WIPO | B01D 50/00 |

*Primary Examiner*—Blaine Copenheaver
*Assistant Examiner*—Ula C. Ruddock

[57] ABSTRACT

The present invention relates to a stiffened fabric for use in cartridge filters comprising flat fabric formed from entangled heat resistant staple fibers having a weight of from 4 to 8 oz/yd$^2$ wherein the stiffened fabric is characterized by a flex modulus of at least 10 KSI measured at 200° C.

6 Claims, No Drawings

HIGH PERFORMANCE FABRICS FOR CARTRIDGE FILTERS

The present invention relates to a high performance fabrics for use in cartridge filters for the filtration of hot gases.

BACKGROUND OF THE INVENTION

Aramid and aramid blend fabrics designed for filter bag have been known for sometime. In many of the application where filter bags are used, cartridge filters could provide a more efficient means of filtration, but the fabrics available for high temperature gas filtration have heretofore lacked the required durability and flexibility for industrial performance that equals that of filter bags.

Fabrics designed for filter bags are generally based on felts such as is described in U.S. Pat. No. 5,171,339. These felts are generally too heavy and stiff when used in a cartridge filter. Such fabrics are prone to break or tear open when the cartridge is pulsed with back pressure to remove particles that have been caught on the filter fabric surface. Lighter weight filter fabrics such as those taught in U.S. Pat. No. 4,536,439 do not have the inherent stiffness to be used in a cartridge filter application.

International Publication No. WO 96/24431 taught a fabric that could be formed into rigid shapes, but this publication did not address the balance of fabric flexibility and stiffness needed in order to make a durable, long service life cartridge filter for hot gas filtration.

It is the object of the present invention to provide a fabric for use in cartridge filters for hot gas filtration applications that has a balance of flexibility and stiffness combined with high filter efficiency.

SUMMARY OF THE INVENTION

The present invention provides a stiffened, pleated fabric for use in cartridge filters comprising a fabric formed from entangled heat resistant staple fibers having a weight of from 4 to 8 oz/yd$^2$ and a resin wherein the stiffened fabric is characterized by a flex modulus from about 10 to 60 at room temperature and at least 10 KSI at 200° C.

The heat resistant fibers useful in the present invention are fibers selected from the group consisting of aramid fibers, glass fibers, fluorinated polymer and co-polymer fibers, polyester fibers, polyphenylene-sulfide fibers and mixtures of these said fibers.

The fabric of the present invention may be stiffened by impregnating a flat fabric with a resin solution. When a resin is used, it is preferred that the resin is present at a concentration of from 25 to 60% by weight based on the weight of the stiffened fabric. The preferred resins to use in stiffening the flat fabric are resins selected from the group consisting of phenol-formaldehyde resins.

The stiffened fabric of the present invention can be made with out the use of a resin when at least 80% by weight of the heat resistant fibers are m-aramid fibers having about 0.25 crystallinity index. In this case heat treatment is used to shrink and stiffen the fabric so that the stiffened fabric has a crystallinity index of about 0.45 and a flex modulus of at least 10 KSI at 200° C. The weight of the fabric before stiffening is from 4 to 8 oz/yd$^2$.

The stiffened fabric of the present invention, whether stiffened by the resin impregnation or by heat treatment may be treated with a coating of fluorinated polymer.

The present invention also encompasses a method for making a pleated fabric for use in a cartridge filter comprising the steps of:

(a) forming a fabric having a weight of from 4 to 8 oz/yd$^2$ from entangled heat resistant staple fibers;

(b) stiffening the fabric by impregnating the fabric with a resin solution;

(c) heating the fabric to evaporate about 90% by weight of the solvent present in the resin solution impregnated fabric;

(d) pleating the resin impregnated fabric;

(e) heating to remove essentially all the solvent from the resin solution impregnated fabric; wherein the pleated fabric has a flex of at least 10 KSI at 200° C.

When the fabric formed in step (a) of this method comprises at least 80% by weight m-aramid fibers having a crystallinity index of about 0.25, then in place of steps (b) to (e) the fabric is first pleated and then heat treated at a temperature of from 260 to 360° C. for a time sufficient to shrink the fabric and locking in the pleats and stiffening the fabric so that after the heat treatment the stiffened fabric has a crystallinity index of at least about 0.45 and a flex modulus of from about 10 to 60 KSI at room temperature and at least 10 KSI at 200° C.

DETAILED DESCRIPTION

The present invention encompasses a stiffened, pleated fabric for use in cartridge filters. This fabric comprises a fabric formed from entangled heat resistant staple fibers to form a fabric having a weight of from 4 to 8 oz/yd$^2$ and a means to stiffen the fabric so that it can retain the pleating at the range of temperatures where it is used. The fabric of the present invention may be stiffened in two ways depending on the fiber composition of the fabric. One method by which the fabric is stiffened is by impregnating the fabric with a resin. The proper balance of stiffness and flexibility is achieved when the stiffened fabric is characterized by a flex modulus from about 10 to 60 at room temperature and at least 10 KSI at 200° C.

When the fabric contains at least 80% by weight m-aramid fibers having a crystallinity index of about 0.25, the fabric may first be pleated and then heat set at a temperature of from 260 to 360° C. for a time sufficient to increase the flex modulus of the fabric to a value of at least 10 KSI measured at 200° C. In the heat setting process the fabric is allowed to shrink. The shrinking densifies the fabric and increases the flex modulus of the heat set fabric measured at 200° C. to a value of at least 10 KSI. This heat setting also increases the m-aramid polymer crystallization to lock-in the pleats. The crystallization index of the heat set fabric should be at least about 0.45.

The term pleated as used herein means shaping the fabric into a desired shape for use in cartridge filters. This shape is generally a series of folds or pleats which operate to increase the surface area of the filter material.

The fabric used for making the stiffened fabric of the present invention are fabrics formed from hydraulically entangled fibers. This process of hydraulically entangling is also known as hydraulically needling. Such fabrics are known as spunlaced fabrics. The fabric of the present invention are non-patterned fabrics made by the process generally described by Bunting et al in U.S. Pat. No. 3,508,308 and more specifically by Hwang in his U.S. patent application Ser. No. 568,171, filed Jan. 5, 1984. In making the fabrics of this invention, poly(m-phenylene isophthalamide) staple fibers having a cut length of 1 to 5 cm are employed, the staple fibers having a crystallinity index of at least about 0.25. The staple fibers are carded, cross-lapped, and made into a batt by a staple air-laydown process of the type described by Zafiroglu in his U.S. Pat. No. 3,797,074. The batt so formed is given a light hydraulic needling to consolidate it and is then repeatedly hydraulically needled at higher water pressures alternately from the top and the bottom of the web.

These spunlaced fabrics are light weight, but are not strong enough or stiff enough to be used in a cartridge filter application without increasing their strength and rigidity. For example, these spunlaced fabrics have essentially a zero flex modulus before they are stiffened.

The preferred fabric weight for the spunlaced fabrics is from 4 to 8 oz/yd$^2$.

The preferred fibers used to form the spunlaced fabric of the present invention are heat resistant fibers, for example, fibers selected from the group consisting of aramid fibers, glass fibers, fluorinated polymer and co-polymer fibers, polyester fibers, polyphenylenesulfide fibers and mixtures of these said fibers. Aramid fibers include m-aramid and p-aramid fibers and mixtures of m- and p-aramid fibers.

The heat resistant fibers may be mixed as desired to provide a fabric having the desired heat resistance and other performance characteristics needed in the filter application.

The spunlaced fabric used in making the stiffened fabric of the present invention has been adapted in the past for use in fabrics for filter bags. These filter bag fabrics were generally felts or felts laminated to membranes or other light, weight fabrics. Such filter fabrics and felts were too bulky to be used in pleated fabric applications. Simply reducing the fabric weight of the felts has not been sufficient in providing a fabric for use in cartridge filters. These known fabrics even if resin impregnated were prone to tear and burst along the fold lines of the pleats making them unacceptable for use in a cartridge filter.

The inventor of the present invention has found that fabrics suitable for use in cartridge filters require a unique combination of stiffness and flexibility. In practice a filter material separates particles from a stream of fluid. In the case of the present invention, particles are separated from a hot gas stream. When the number of particles adhering to the surface of the filter fabric is high enough to decrease the gas flow across the fabric, the particles are removed by a back pressure pulse of compressed air which reverses the flow of gas so that it flows the direction opposite to the process gas flow flexing the filter fabric and causing the particles caught on the fabric surface to be released. Fabrics used in filter bags are free to flex and can be made fully flexible since the fabric must only support its own weight and the weight of the particles that collect on the bag's surface. But a fabric used in a cartridge filter application must first be stiff enough to retain pleat integrity. Since the stiffened, pleated fabric is confined between the cartridge housing, it cannot flex freely. When subjected to the pulse of back pressure, a fabric which is too stiff will break open, usually along the fold line of the pleat. The filter fails, and the particles that were to be separated from the gas stream pass through the filter contaminating the gas. A fabric, that is not stiff enough at the temperature where it is used, may loose pleat retention by the pleats collapsing as the particle are collected on the fabric surface, or during a back pulse cycle the pleats may be blown out, become too soft or separate from the housing.

The inventor of the present invention has found that light weight fabric stiffened to a particular flex modulus have sufficient stiffness and flexibility to be suitable in cartridge filter applications. For fabrics stiffened by resin impregnation, the stiffened fabric of the present invention must have a flex modulus of from 10 to 60 KSI at room temperature and a flex modulus at 200° C. of at least 10 KSI. Flex modulus is measured by ASTM D2344. The term room temperature as used herein means a temperature of from about 18 to 25° C.

Through testing the inventor of the present invention has found that phenol-formaldehyde resins are particularly preferred for use in cartridge filter applications. These resins provide sufficient stiffness and flexibility at temperatures of 200° C. and higher to operate successfully over many back pulse cycles. Examples of these resin suitable for the present invention are AEROTAP 8121, a phenol-formaldehyde resin available from Ashland Oil Company and Plyophen 23055.

Phenol-formaldehyde resins may be partially cured, known as B stage curing. Fabrics impregnated with these resins and B staged may be easily pleated. The cartridge filter may then be fully cured by baking at a higher temperature or it may be cured when it is placed in service (by the heating in the hot gas stream that is to be filtered). In B stage curing the resin impregnated fabric is baked at a temperature of about 120° C. so that about 90 to 95% of the solvent from the resin impregnation solution is removed.

Other resins may be suitable for use in the present invention as long as the resin impregnated stiffened fabric meets the requirements of flex modulus. Resins that do not provide this desired combination of stiffness and flexibility in the stiffened fabric will be prone to break open in service causing the cartridge filter to fail.

The upper limit of flex modulus depends on the fabric weight. At 200° C. it is preferred that the upper limit of flex modulus be from about 70 to about 100 KSI. This prevents the fabric from being too brittle.

Not only must the filter fabric have the proper balance of stiffness and flexibility to provide a long, failure free service life, it must also have excellent filtration efficiency. As demonstrated in the Examples below, filtration efficiency is a balance in the selection of the denier of the fiber used in making the entangled fabric and in the weight percent of resin present in the stiffened fabric. The preferred fiber denier is 1 gpf, although 1.5 dpf also provides an excellent starting fabric. The preferred weight range for the resin in the stiffened fabric is from 25 to 60% by weight. Higher resin contents are generally associated with the larger denier filaments.

Filter efficiency was measured as described in Volume 4, Number 4 issue of the *Journal of Industrial Fabrics* (1986). Starting at page 12 of this journal in the article titled "TEFAIRE Felt—an Industrial Fabric Designed for Filtration of Particles in a Hostile Environment", an apparatus and description is shown for the determination of filter performance (efficiency). (TEFAIRE is a trademark of E.I DuPont de Nemours and Company, Inc. of Wilmington, Del.) This apparatus and method was used in collecting the data in the Examples below.

Although other methods may be used, the resin impregnation may be accomplished by simply dipping the fabric in a resin solution and padding the excess solution from the fabric. The resin impregnated fabric may then cured or baked at the desired temperature to achieve the desired level of cure or the desired degree of solvent removal. The solids in the resin solution are typically adjusted to the level required to achieve the desired concentration of resin in the stiffened fabric.

When the spunlaced fabric contains at least 80% by weight m-aramid fibers that have a crystallinity index of about 0.25, then the fabric may be stiffened without the use of a resin. The term crystallinity index is an empirical value calculated from an intensity ratio measured from the 24° and 27° (2θ) peaks from an x-ray diffraction pattern. The technique for measuring the crystallinity index is described and illustrated with an example calculation in U.S. Pat. No. 4,536,439. Although the crystallinity index is a measure of the degree of crystallinity of a polymer, it is to be interpreted as being linearly proportional to the amount of crystallinity in the polymer. When the m-aramid polymer has a crystallinity index of not more than about 0.25, the fiber and the fabric containing this polymer, when heat treated at a temperature of from 260° to 360° C. will shrink. This shrinkage has been a problem in earlier applications of such fabrics, but in this case the combination of the fabric shrinkage and increasing polymer crystallization with heat produces a desired increase in the flex modulus of the fabric. Thus, an 80% by weight, spunlaced fabric having essentially a zero flex modulus can be heat treated at a temperature of from 260 to 360° C. for a time sufficient for the flex modulus of the fabric to increase to at least 10 KSI as measured at 200° C. Heating times will vary with the temperature used, but generally range from 10 to 18 hours for spunlaced fabrics having a weight of from 4 to 8 oz/yd$^2$.

The stiffened fabric of the present invention, whether stiffened by resin impregnation or by heat treatment may be treated with fluoropolymers. For example a fluoropolymer solution may be sprayed or padded on the stiffened fabric before or after it is pleated. The fabric may be dipped in a fluoropolymer solution or the fluoropolymer may be mixed into the resin solution used for fabric impregnation. The fluoropolymer concentration in the stiffened fabric is preferred to be from 10 to 30% by weight. Fabrics may also be laminated to a fluoropolymer membrane by a high temperature calendering process.

The stiffened fabric of the present invention may be made by the following process:

(a) forming a fabric having a weight of from 4 to 8 oz/yd$^2$ from entangled heat resistant staple fibers;

(b) stiffening the fabric by impregnating the fabric with a resin solution;

(c) heating the fabric to evaporate about 90% by weight of the solvent present in the resin solution impregnated fabric;

(d) pleating the resin impregnated fabric;

(e) heating to remove essentially all the solvent from the resin solution impregnated fabric; wherein the pleated fabric has a flex modulus of from about 10 to 60 KSI at room temperature and at least 10 KSI at 200° C. The preferred resin concentration is from 25 to 60% by weight of the stiffened fabric.

When the fabric comprises 80% by weight m-aramid fibers having a crystallinity index of about 0.25 and wherein in place of steps (b) to (e) the fabric is first pleated and then heat treated at a temperature of from 260 to 360° C. for a time sufficient to shrink the fabric and locking in the pleats and stiffening the fabric so that after the heat treatment the stiffened fabric has a flex modulus of at least 10 KSI at 200° C.

A fabric may be treated with a fluoropolymer by surface coating or dipping the stiffened fabric of step (c) into a dispersion of the fluoropolymer particles in a liquid and then drying off the liquid. The process is then completed by performing steps (d) and (e).

A fluoropolymer membrane may be laminated on the stiffened fabric by a high temperature calendering step following step (c). The laminated fabric is then pleated and if need may be heated to remove the remaining solvent.

The following Examples are intended to illustrate the present invention, but not to limit it.

EXAMPLES

Example 1

This example illustrates the evaluation of resin types for use in making the stiffened fabric of the present invention.

The following resin types were evaluated: acrylics, nitrile resins, epoxy and epoxy acrylic resins, acrylic-melamines, Pyre ML60 & 69, nitrile-melamine and phenol-formaldehyde resins.

The fabrics for testing were prepared as follows: 100% m-aramid spunlaced fabric available from DuPont as spunlaced NOMEX brand aramid fabric type E 88 weighing from 4 to 8 oz/yd$^2$ was cut into 12×12 inch sections. Each sections were dipped into solutions of the resin to be tested padded dry and baked to cure the resin or to evaporate the solvent. All resin treated fabrics were fully cured except the phenol-formaldehyde resins which were only B staged cured.

The resin concentration in the resin solutions were adjusted so that the fabric when cured contained from 30 to 60% resin. In most cases the resin solutions were about 20% by weight resin. The fabrics were cured or baked at the temperatures recommended by the resin manufacturer.

After baking or curing, the resin treated fabrics were pleated on a laboratory pleater so that each had the same pleat pattern.

These pleated fabrics were tested according to ASTM D2344 to determine the flex module at room temperature (18–25° C.) and at 200° C. Comparative data is shown below.

TABLE 1

| Resin Type | Evaluation at 200° C. |
|---|---|
| Acrylic | Poor Pleat retention |
| Nitrile Resins | Poor Pleat Retention |
| Epoxy & Epoxy-Acrylic | Too Soft |
| Acrylic-Melamine | Too Soft |
| Pyre ML60 & 69 | Too Soft |
| Nitrile-Melamine | Too Soft |
| Phenol-formaldehyde | Acceptable |

Example 2

Fabrics were made according to Example 1 using only phenol-formaldehyde resin to test filtration efficiency.

The spunlaced fabric was made using either 1 or 1.5 dpf fiber. The resin content of the B staged resin treated fabric ranged from 30–60% by weight. The range of fabric weight before resin treatment was 4–6 oz/yd$^2$.

The resin treated fabrics were tested as flat panels as described in Volume 4, Number 4 issue of the *Journal of Industrial Fabrics* (1986) pages 4 to 19. Results are shown in Table II below. Mullen Burst was determined by ASTM 461 and air permeability (air perm) was determined by D 737-32.

As comparison a commercial 14 oz/yd$^2$ felt filter material was tested as a control. It had a pore size of 22.4 and a filter leakage of 0.00026.

In the table below, MIT flex cycles are reported as cycles to failure (cycles/failure) in the machine and cross machine direction, respectively.

TABLE II

| Sample / MIT Flex cycles/failure | Fabric Pore Size microns / Wt | Fiber dfp / Filt Leakage gr./acf | Resin Level % | Mullen Burst psi | Air Perm cfm/ft2 | Bending Mod. KSI @ 200° C. |
|---|---|---|---|---|---|---|
| A | 4 | 1.0 | 62 | 184 | 29 | 49 |
| B | 4 | 1.5 | 63 | 204 | 45 | 73 |
| C | 4 | 1.0 | 58 | 186 | 28 | 39 |
| D |  |  |  |  |  |  |
| E<br>1815/1143 | 4<br>0.00059 | 1.5 | 37 | 153 | 87 | — |
| F<br>2465/3256 | 8<br>— | 1.5<br>0.00020 | 37 | 236 | 81 | — |
| G<br>24575/2960 | 4<br>26.0 | 1.0<br>0.00022 | 30 | 128 | 61.5 | 29.5 |
| H 6<br>24.8 | 1.0<br>0.00011 | 34.2 | 166 | 40 | 15.5 | 4584/3072 |

From the Table it can be seen that by selection resin content fiber denier and fabric weight a combination can be made that produces a durable efficient, light weight, pleated filter fabric.

Example 3

This example illustrates the use of heat setting as a means to get the required stiffness in a fabric containing at least 80% by weight m-aramid fiber having a crystallinity index of about 0.25.

The spunlaced fabric was made with 1.7 dfp fiber having a degree of crystallization of about 0.25. 12×12 sections of this fabric were cut for pleating on a Chandler black type pleater.

The pleated fabric samples were positioned between two supports so that the pleating was retained, but the fabric was free to shrink. No force or restraint other the support was applied to the fabric during the heat set process. The fabric was heated to a temperature greater than 300° C., but no so high as to cause thermal damage to the fibers. One of the 12×12 sample was heated for 18 hours; the second 12×12 sample was heated for 48 hours.

A comparison to a resin treated fabric is shown in Table 3. In the table, MIT flex cycles are reported as cycles to failure (cycles/failure) in the machine and cross machine direction, respectively.

The heat set fabric had permanent pleats having good stiffness.

TABLE 3

|  | Control |  | Heat Set Fabric |
|---|---|---|---|
| Fiber denier | 1.0 |  | 1.7 |
| Resin level % | 30 |  | 0 |
| Heat Set ° C. | 200 | none | 300 |
| Weight oz./sq. yd. |  |  |  |
| Base | 4 | 4.5 | 5.5 |
| Coated | 6.7 | — | — |
| Mullen Burst psi | 128 | 154 | 171 |
| Air Perm cfm/ft$^2$ | 61.5 | 68 | 54 |
| Bending Mod. KSI @ 200° C. | 29.5 | ~0 | 10.3 |
| MIT Flex cycles/failure | 4575/2960 | — | 30,900 |
| Filt. Leakage gr./acf | 0.00022 | 0.00042 | 0.00022 |
| Delta P in. water | 5.65 | 4.8 | 5.9 |
| Dust Pickup % | 15.9 | 18.6 | 25.1 |

What is claimed is:

1. A stiffened, porous, fabric for use in cartridge filters comprising a spunlaced fabric formed from entangled heat resistant staple fibers having a weight of from 4 to 8 oz/yd$^2$ and a resin wherein the stiffened fabric exhibits a flex modulus from about 10 to 60 KSI at room temperature and at least 10 KSI at 200° C.

2. The stiffened fabric of claim 1 wherein the heat resistant fibers are selected from the group consisting of aramid fibers, glass fibers, fluorinated polymer and co-polymer fibers, polyester fibers, polyphenylenesulfide fibers and mixtures of these said fibers.

3. The stiffened fabric of claim 1 wherein the resin is present at a concentration of from 25 to 60% by weight based on the weight of the stiffened fabric.

4. The stiffened fabric of claim 3 wherein the resin is selected from the group consisting of phenol-formaldehyde resins.

5. A stiffened, pleated, porous, fabric for use in cartridge filters comprising a spunlaced fabric having a weight of from 4 to 8 oz/yd$^2$ formed from entangling heat resistant fibers wherein at least 80% by weight of the heat resistant fibers are m-aramid fibers having a crystallinity index of about 0.25 and wherein the stiffened fabric has a crystallinity index of at least about 0.45 and a flex modulus of at least 20 KSI at 200° C.

6. The stiffened fabric of claim 1 or 5 wherein the fabric is treated with a coating of fluorinated polymer.

* * * * *